(12) United States Patent
Rops et al.

(10) Patent No.: US 8,475,626 B2
(45) Date of Patent: Jul. 2, 2013

(54) MULTIPLE CONNECTED CHANNEL MICRO EVAPORATOR

(75) Inventors: Cornelius Maria Rops, Waalre (NL); Johannes Fransiscus Maria Velthuis, Leiden (NL); Frederik van der Graaf, Zuidland (NL); Leon Ferdinand Gerard Geers, Valkenburg (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 354 days.

(21) Appl. No.: 12/809,654

(22) PCT Filed: Dec. 22, 2008

(86) PCT No.: PCT/NL2008/050846
§ 371 (c)(1),
(2), (4) Date: Sep. 22, 2010

(87) PCT Pub. No.: WO2009/082230
PCT Pub. Date: Jul. 2, 2009

(65) Prior Publication Data
US 2011/0000624 A1     Jan. 6, 2011

(30) Foreign Application Priority Data
Dec. 21, 2007   (EP) .................................. 07150402

(51) Int. Cl.
*B01D 1/00*     (2006.01)
*B01D 3/00*     (2006.01)

(52) U.S. Cl.
USPC ............ 159/28.5; 159/22; 202/239; 202/270; 202/176; 422/610

(58) Field of Classification Search
USPC .............. 165/174; 159/22, 49, 28.5; 202/232, 202/267.2, 239, 270, 176; 422/528–530, 422/603–617
See application file for complete search history.

(56) References Cited

U.S. PATENT DOCUMENTS

| | | | |
|---|---|---|---|
| 7,722,740 B2 * | 5/2010 | Klemm et al. | 159/49 |
| 8,221,528 B2 * | 7/2012 | Tonkovich et al. | 95/232 |
| 2006/0102332 A1 * | 5/2006 | Taras et al. | 165/174 |
| 2007/0246106 A1 | 10/2007 | Tonkovich | |
| 2008/0043431 A1 * | 2/2008 | Marotta et al. | 361/689 |

FOREIGN PATENT DOCUMENTS

| | | |
|---|---|---|
| WO | 96/10747 | 4/1996 |
| WO | 99/09042 | 2/1999 |
| WO | 2006/108796 | 10/2006 |
| WO | 2006/110458 | 10/2006 |

OTHER PUBLICATIONS

Klvas F. Jensen: "Microreaction engineering ? is small better?" Chemical Engineering Science, Oxford, GB, vol. 56, Jan. 1, 2001, pp. 293-303.

* cited by examiner

*Primary Examiner* — Nina Bhat
(74) *Attorney, Agent, or Firm* — Reed Smith LLP; Maryellen Feehery Hank

(57) ABSTRACT

An evaporator for evaporating a liquid containing fluid, having an inlet and an outlet connected to an evaporation volume with an internal structure, the inlet and the outlet defining a main flow path there between and the cross-section of the evaporation volume is substantially constant along the main flow path is described. A method method for evaporating a liquid containing fluid by providing an evaporator supplying a liquid containing feed stream to the inlet; exerting heat; choosing the operating conditions so that an annular flow is created.

8 Claims, 5 Drawing Sheets

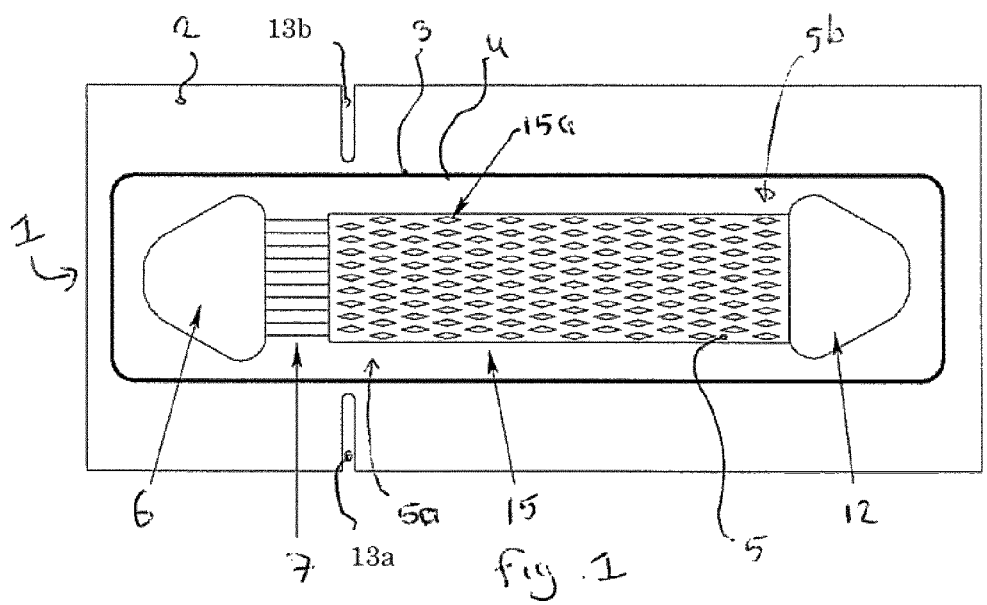
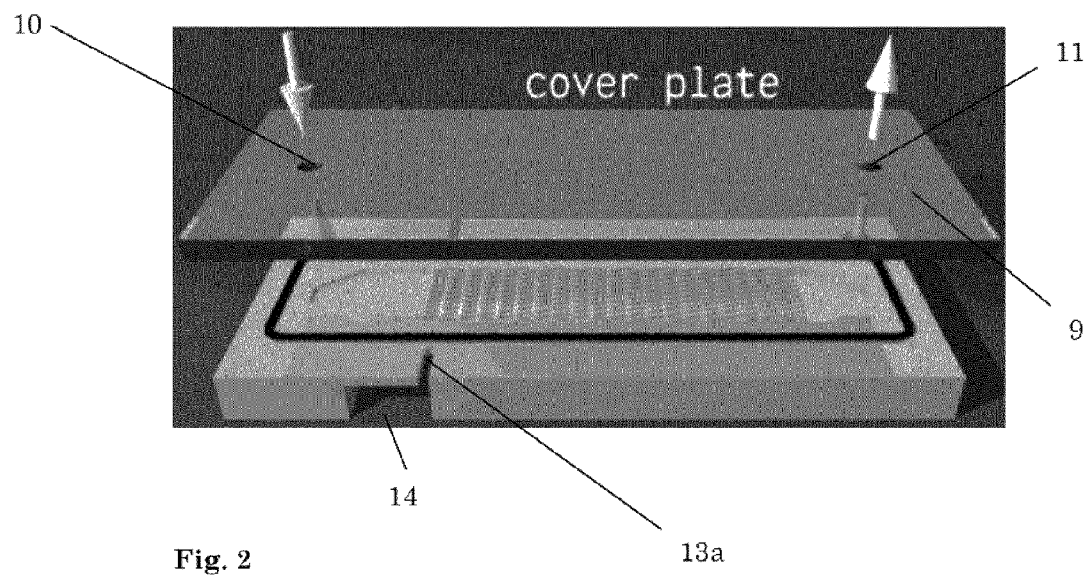
Fig. 2

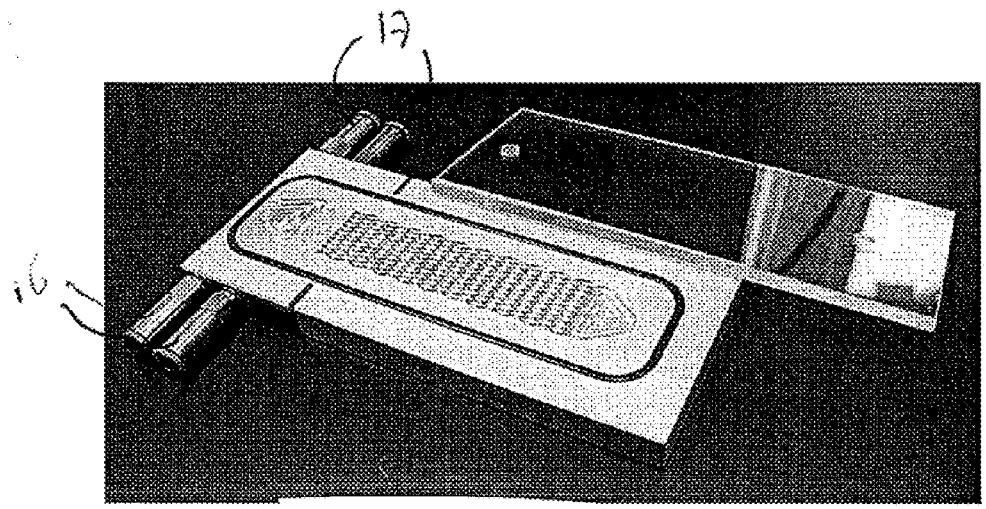
Figure 3 –
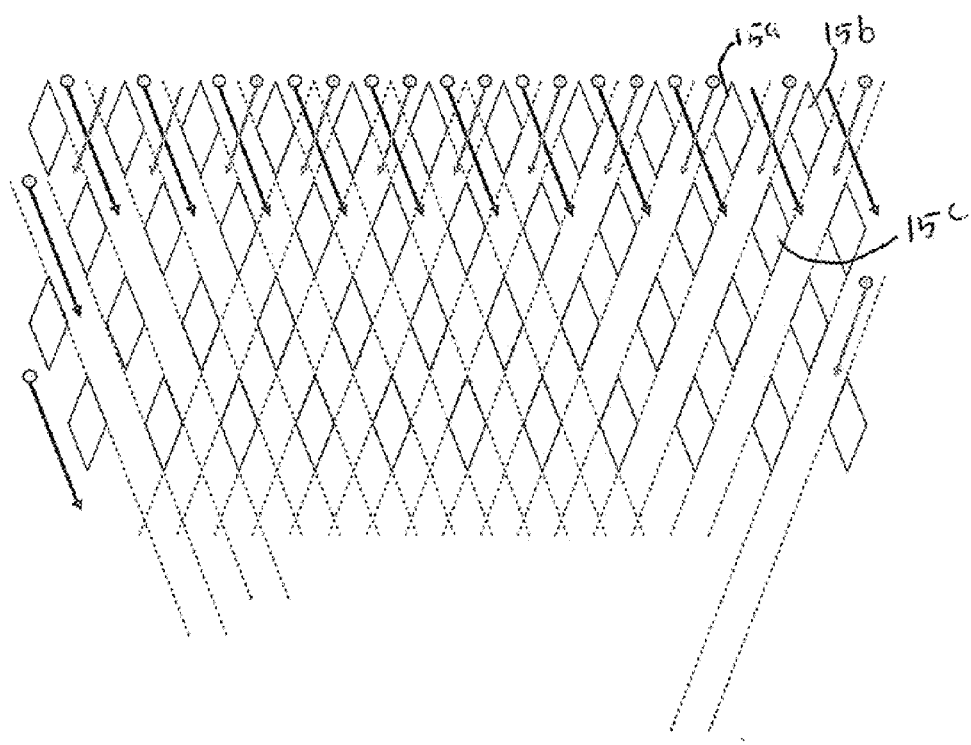
Fig. 4

1. diamonds : 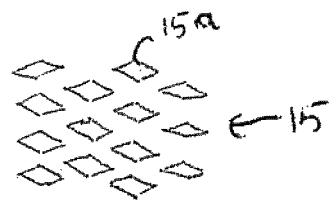
2. rectangulars : 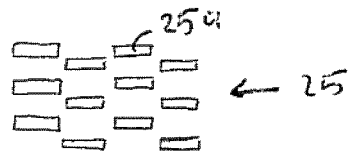
3. ellipses : 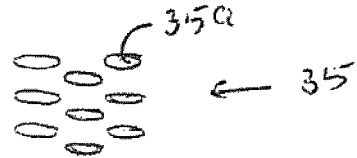
fig. 9

MULTIPLE CONNECTED CHANNEL MICRO EVAPORATOR

RELATED APPLICATIONS

This application is the United States National Stage of International Application No. PCT/NL2008/050846, filed Dec. 22, 2008, which was published as International Publication No. WO 2009/082230, and which claims benefit of European Patent Application No. 07150402.1 filed Dec. 21, 2007. Both applications are incorporated by reference in their entirety herewith.

The invention relates to a micro evaporator and a method of its use. These evaporators are generally designed for and used in micro fluidic manipulation in for instance lab-on-a-chip and process-on-a-chip applications, which are for instance practiced in the pharmaceutical and the fine chemical process industry. In this field of micro processing, micro reactors, mixers and/or separators have very specific, stable and controllable feed stream requirements. In order to meet these requirements, the evaporator needs to provide these streams within narrow specifications. However, in known micro evaporator systems, pressure fluctuations occur which cause instabilities in the outflow vapor stream. These pressure fluctuations can in the evaporator itself for instance give rise to an unstable evaporation, backflow and possible entrapment of vapor in the supply channels of the micro evaporator.

The pressure fluctuations are induced by the explosive growth of large vapor bubbles (vapor slugs). The vapor inside the slug bubble is unable to leave the evaporator structure easily, which is due to liquid blockage in front of the vapor slugs. This blockage leads to a pressure rise inside the vapor slug and a possible expansion of the vapor against the flow direction.

In the art, pressure fluctuations, backflow and non-uniform vapor outflow are usually tackled in micro devices using the following strategy:

1. Providing an increased pressure drop at the evaporation channel inlet. The application of a pressure drop at the evaporation channel entrance must be rather high to avoid the flow instabilities.

2. Enlarging of the outflow volume to compensate for the vapor volume increase. The enlargement of the outflow volume may increase the total percentage of evaporated flow and the pressure fluctuations might be decreased as well, however as stand-alone solution it will not avoid back flow, with all its resulting drawbacks. Also in combination with the increased inlet pressure drop, the evaporation process cannot provide a stable vapor outflow.

3. Implementing a temperature profiles along the evaporation channel. However, the temperature profiles are complicated to realize, and they are dependent on the specific liquids, the flow and the other conditions of the outflow of the vapor. With dedicated temperature profiles, often the workable flow range is limited.

An example of a micro evaporator is disclosed in the international patent application WO 2006/108796. The evaporating volume of this micro evaporator is equipped with specific structures. The evaporating volume is designed such that along the flow path of the fluid the cross-section of the volume increases.

A serious drawback of such evaporators is that the evaporation zone i.e. the space within the evaporator volume between the interface where the evaporation of the fluid passing through starts to evaporate and the interface where the total liquid of the fluid passing through has evaporated experiences different cross sections along the flow path of the fluid(s). This makes it very difficult to design the correct dimensions of the evaporator. Furthermore with slightly changing conditions, the evaporation zone will shift in position along the evaporator chamber and will thus experience different cross-sections with different heat-influxes. These differences in heat influx and evaporating surface are a source of instabilities, which will give rise to instable and/or fluctuating vapor flow.

WO-A-99/09042 discloses devices for extracting sensitive components from a fluid sample. In these devices samples for biology and biomedical diagnostics are inserted for amongst others genetic analysis. In the devices, biological material to be investigated, such as nucleic acids, adheres to the internals of the device, while the sample is run through the device. After this step, the adhered material is washed and hereafter re-eluted in a concentrated form. In these devices, samples cannot be heated above 37° C. in order to prevent damaging or destroying the components, e.g. nucleic acid material, to be concentrated. The device according to WO-A-99/09042 is thus not suitable for evaporation.

US-A-2007/246106 discloses flow distribution channels to control flow in process channels. US-A-2007/246106 is not directed to evaporators or evaporation methods.

In Journal of Chemical Engineering Science 56 (2001) 293-303, Jensen et al. disclose micro fluidic reactors. Jensen et al. do not disclose an evaporator or evaporation methods.

WO-A-96/10747 discloses an analytical device and a method for determining the presence or amount of an analyte in a test sample, utilizing arrays of structures. WO-A-96/10747 does not disclose an evaporator or evaporation methods.

WO-A-2006/110458 discloses an apparatus and a technique for flow control through plural parallel connecting channels from a manifold. WO-A-2006/110458 does not disclose an evaporator or evaporation methods.

It is an object of the current invention to provide a micro evaporator that overcomes one or more drawbacks of the evaporators known in the art. A further object of the invention is to provide an evaporator that is relatively simple to design and to manufacture, that provides a stable reproducible flow of vapor at various flow conditions. Yet another object of the invention is to provide an improved method of operating a micro evaporator.

This object is reached by the evaporator, which comprises an inlet and an outlet connected to an evaporation volume, the inlet and the outlet defining a main flow path there between, wherein the evaporation volume is equipped with an internal structure and the cross-section of the evaporation volume is substantially constant along the main flow path. Additionally, the object is reached by the method comprising providing an evaporator, supplying a liquid containing feed stream to the inlet of the evaporator, exerting heat to the evaporator volume and choosing the operating conditions of the evaporator thus that an annular flow is created within the evaporator volume.

In the current invention these problems are solved by tackling the origin of the pressure fluctuations: the slug flow pattern. In general, due to the size reduction the two phase flow pattern "slug flow" is most likely to appear, with all possible negative consequences. The liquid slug break-up structure accomplishes a fast transition through this undesired flow pattern in to the favorable "annular flow" flow pattern. A thin liquid layer stuck on the heated wall (one of the characteristics of annular flow) induces a high heat flux and thus large evaporation rates. The "connected channel structure" provides many alternative paths for the vapor flow, thus reducing possible pressure build-up and thus minimizing the pressure fluctuations.

By creating a break-up structure for the blocking liquid, an exit path with little flow resistance is offered to the vapor. The blocking liquid is smeared out over the breakup structure, which is suited for rapid evaporation (near critical heat flux). The liquid enters the evaporator and passes first through a divider manifold. This divider manifold contains a structure, for instance a set of supply channels with a relatively small cross section, which provides a relative high flow resistance with respect to the flow resistance in the downstream evaporator volume. Thus a substantial pressure drop is induced in the divider manifold compared to the structure downstream, just upstream of the location where the heated evaporation structure is provided. Care is taken to thermally isolate the divider manifold from the evaporation structure to prevent premature evaporation in the manifold.

A further advantage of the evaporator and the method of evaporating is that a rapid and reproducible evaporation of small amounts of liquid can be provided, for instance for use in analysis processes, where very often only very small amounts of substances are available.

Another advantage of the invention is that a fast response in a change of conditions can be provided. The evaporator is able to generate a stable, controllable and reproducible vapor flow in steady state or batch operated processes.

BRIEF DESCRIPTION OF THE DRAWING

For a better understanding, examples of an interface device will now be further elucidated by the following Figures, wherein:

FIG. 1 is a schematic top view on an evaporator according to a first embodiment of the invention;

FIG. 2 is a perspective view on an evaporator according to the first embodiment of the invention;

FIG. 3 is a perspective view on a second embodiment of the invention

FIG. 4 is a schematic top view of the evaporating structure according to the first embodiment of the invention;

FIG. 9 is a schematic top view of some structures applied in embodiments of the invention.

In this description the same or corresponding parts will have identical or similar reference signs. The embodiments shown should not be understood as limiting the invention in any way or form.

FIG. 1 depicts an evaporator 1 of the lower housing part 2 wherein a groove 3 is machined wherein a seal 4 can be placed. The lower house part 2 can be machined from a solid block material. This material can be for instance a metal such as aluminum. Other suitable metals and/or metal compositions can be applied as well. Especially with aggressive fluids the aluminum must at least be provided with a coating of a less reactive material in order to prevent corrosion or other unfavorable reactions. The housing can alternatively be made of ceramic material or suitable thermo-set polymers.

Figure 5:
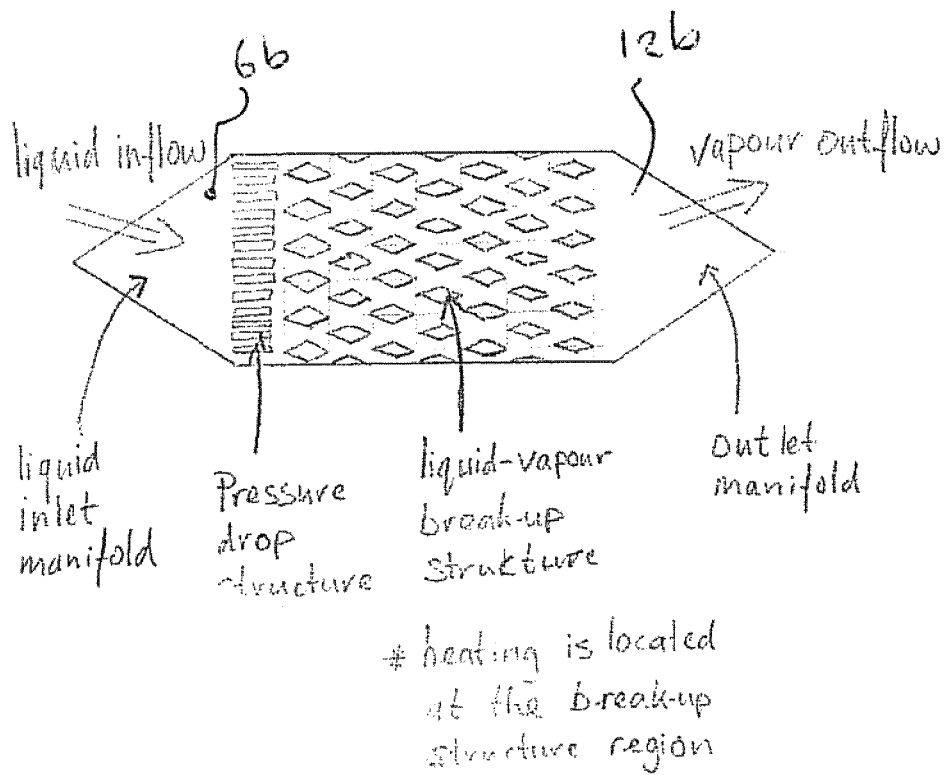
FIG. 5 is a schematic top view of a further embodiment of the invention.

Within the lower housing part 2, the evaporating chamber 5 is positioned. The evaporator chamber is at its inlet side 5a connected to a set of supply channels 7, which are connected to an inlet plenum 6. The supply channels create a pressure drop preventing vapor bubbles in the heat transfer area from travelling upstream into the inlet plenum. As these channels pose the strongest restriction to flow of the whole system, it is expected that the pressure drop over the system is mainly determined by the flow through these channels.

The cross section of the evaporation chamber 5 is substantially constant along the flow path of the chamber 5. The inlet manifold or inlet plenum 6 should be designed such that no vapor is retained therein. If vapor is retained in the inlet manifold or inlet plenum, some of the supply channels 7a of the supply structure 7 can block, which can lead to maldistribution of the fluid and/or the occurrence of dead zones within the evaporation chamber 5. The inlet manifold can additionally be provided with guidance fins or other guidance structures to enhance a well distributed flow.

Liquid enters the inlet plenum 6 via a port or inlet 10 in the top plate, which is made of glass or any other suitable material. It is spread across the plenum 6, mostly without encapsulating air, and it will flow into the heat transfer area of the evaporator chamber 5 via narrow supply channels 7a. These channels 7a prevent backflow of vapor into the inlet plenum 6. The heat transfer area of the evaporation chamber 5 is equipped with diamond pillars 15a that serve four purposes:

1. Expanding the surface area available for heat transfer. As a result, high mass flow rates can be achieved.

2. Creating small channels in which surface tension forces are significant compared to inertia forces of the flow and forces resulting from explosive vapor bubble expansion. Surface tension enhances the distribution over the channels between the diamond structures.

3. Creating a pressure drop by obstructing the flow. The result of this is that the phase transition area (PTA)—the zone in which nucleate boiling is taking place—is reduced in length. Additionally, the surface tension in the small channels tends to stabilize the phase boundary.

4. Vapor bubbles and liquid slugs will break up on the (sharp) edges of the diamond structures, increasing the surface area of the phase boundary. The annular flow type breaks down large scale oscillations.

The outlet plenum 12 can act as a phase separation area. If the out flowing medium contains both liquid and vapor phases, these phases will be separated in the outlet plenum 12. The vapor will leave the plenum 12 via the outlet port 11 in the (glass) top plate 9 and the liquid will stay in the outlet plenum 12 or flow back into the heat transfer area 5. In both cases it will eventually evaporate and leave the plenum 12 as vapor.

Figure 6:
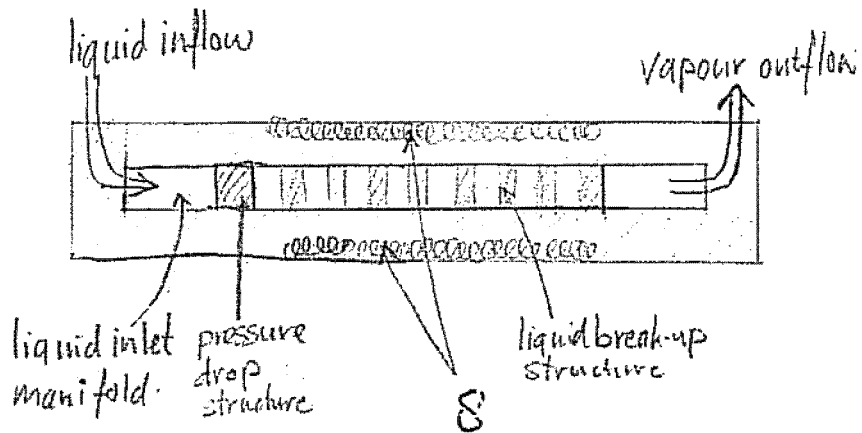
FIG. 6 is a schematic side view of the embodiment of FIG. 5.

Within the lower housing part 2, a heat source 8 is arranged. This can alternatively be placed in other parts of the evaporator as well, as is shown in FIG. 6. In this figure a heat source 8 is provided in the cover part 9. In FIG. 2, the cover part 9 is provided with an inlet 10 and an outlet 11. When the cover part 9 is placed on the lower housing part 2, the inlet 10 coincides with the inlet plenum 6 and is in fluid connection therewith. Similarly the outlet 11 coincides with the outlet plenum 12 and is in fluid connection therewith. The lower housing part 2 is provided with slots 13a and 13b and with opening 14 cut away from the housing in order to increase the temperature jump between the section of the lower housing part 2 wherein the evaporation chamber 5 is provided and the section of the lower housing part 2 with the supply structure 7. This prevents any liquid from prematurely evaporating within the channels of the supply structure 7.

The evaporation chamber 5 is equipped with a regular argyle structure of diamond shaped pillars 15. The argyle structure has an orientation such that the fluid experiences in its main flow direction the pillars 15 in a staggered way. Thus any vapor enclosures (bubbles, slugs) break up rapidly and efficiently by colliding with a pillar staggeredly positioned downstream the flow path of two upstream pillars where the fluid is originating from. The sharp edges of the diamond shaped pillars 15 will provide an efficient break up of any slug or bubble.

Furthermore the argyle structure provided a surprisingly good distribution and redistribution of fluid flow with the evaporation chamber 5. In one experiment some of the supply channels were blocked. This lead to an initially uneven distribution of fluid flow, however the argyle arranged diamond pillars 15a could redistribute the fluid efficiently within the evaporator chamber 5.

The cover 9 and the lower housing part 2 can be tightly closed off by the seal 4. Thereto the seal 4 is captured by groove 3 and is slightly offset with respect to the upper surface of the lower housing part 2. The cover 9 can be made of any suitable material of construction, although for studying the two phase behavior within the evaporator it can be made of a translucent material such as glass.

In FIG. 3, additional inlets 16 and outlets 17 are provided for additionally cooling the inlet section of the lower housing part 2. These provide additional cooling in order to prevent premature evaporation within the inlet plenum 6 and/or he supply structure 7.

In FIG. 4, a schematic arrangement of the argyle diamond shaped pillar structure 15 of the heating chamber 5 is shown. In this structure, in the main fluid flow direction a channel between two pillars 15a and 15b is experiencing downstream a staggeredly positioned pillar 15c. Thus the downstream pillar 15c will break up any slug or bubble originating from the channel between pillars 15a and 15b. Throughout the whole structure this effect will occur, thereby guaranteeing an evenly distributed layer of liquid on the surface of the pillars and thus an annular flow regime within the two phase evaporation zone. By this distribution hot spots and instable flow within the evaporation chamber 5 are prevented.

In FIG. 5, an alternative inlet plenum 6b and the outlet plenum 12b are provided having both a substantially triangular shape. Different shapes and forms of the inlet and/or the outlet plenum are considered to be covered by the invention. Any suitable inlet manifold 6, 6b that generates an evenly distributed flow can be applied. The outlet manifold 12, 12b, 12c again can be shaped such that an evenly distributed collection of the vapor flow is guaranteed such that the occurrence of dead areas within the evaporation chamber 5 is prevented.

In FIG. 6, the heating elements, in this case electric resistive heaters, are both provided in the lower housing part 2 and the cover part 9. Any other source of heat can be applied in the evaporator as well. For instance a flow of a hot fluid through channels within the material surrounding the evaporation chamber 5 can be provided. The heating can also be performed by radiation from an external source such as solar radiation, the use of a suitable burner and/or the incorporation of nuclear active heat generating material within the lower housing part and/or the closing part.

Figure 7:
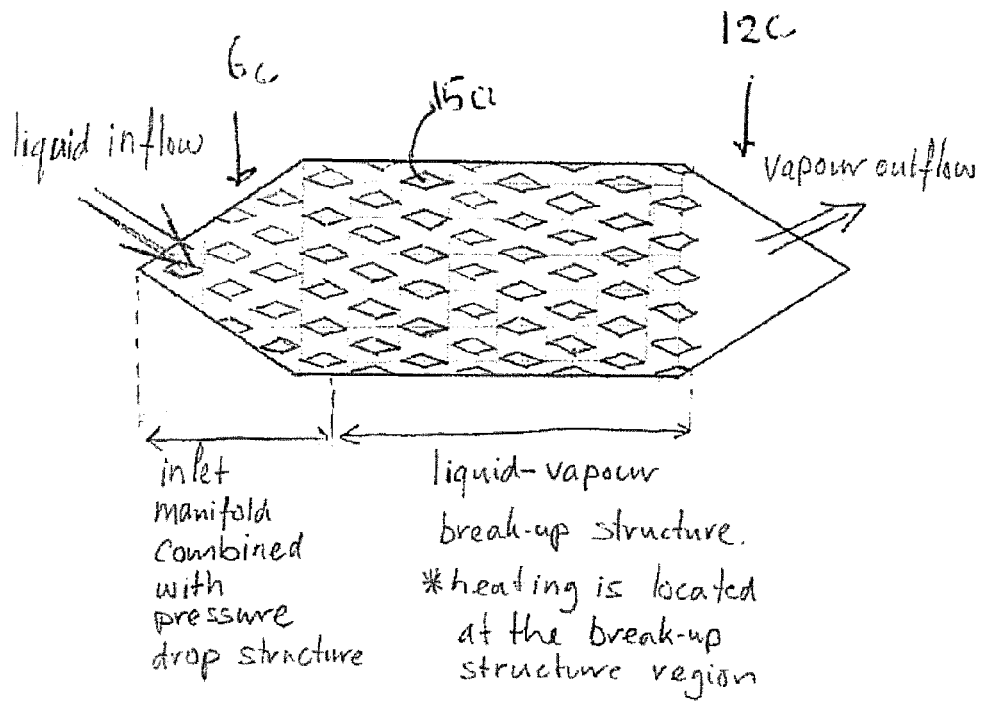
FIG. 7 is a schematic top view of another embodiment of the invention.

In FIG. 7, alternatively in the inlet 6c is provided with pillars 15a as well. An advantage of this structure 15 in the inlet manifold is that no trapped vapor, air or another gas will occur in the inlet manifold. Furthermore by applying this structure 15, the occurrence of dead zones is avoided. Alternatively the inlet manifold or plenum 6, 6b, 6c can be such that the contact angle between the fluid and the solid walls of the inlet 6, 6b dictates a straight fluid front flowing towards the supply channels.

Figure 8:
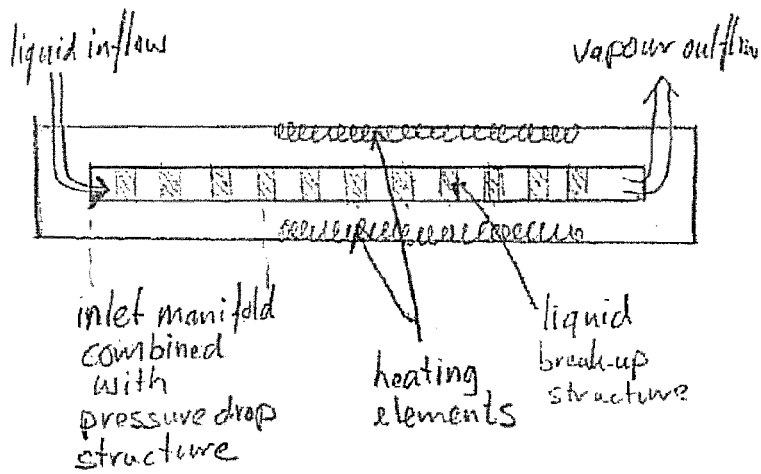
FIG. 8 is a schematic side view of the embodiment of FIG. 7.

In FIG. 8, a cross section of the embodiment of FIG. 7 is shown with again the heating elements 8 provided in the lower housing part 2 as well as in the cover part 9.

In FIG. 9, some alternative structures 15, 25 and 35 are provided. The structures are mainly arranged that the pillars 15a, 25a, 35a are substantially arranged in a staggered way with respect to the main flow direction for reasons explained before. The structure 15, 25, 35 can thus also comprise substantially rectangularly shaped pillars 25a or substantially elliptically shaped pillars 35a. The pillars can be alternatively shaped, such as for instance: substantially triangularly shaped, substantially hexagonally shaped, and/or substantially circularly shaped. When the pillars are triangularly and/or hexagonally shaped they can be arranged in a honeycomb pattern.

A more thorough understanding of two phase flow behavior within the evaporator is presented in the following analysis:

Herein an annular flow is defined as a multiphase-flow regime in which the lighter fluid, the vapor flows in the center of the channel, and the heavier fluid is contained in a thin film on the channel walls.

The specifications of the evaporator are dependent on its application and the required process conditions of the fluid at the inlet and the outlet of the evaporator and the dimensions, materials, fluids, performance and stability criteria, etc. can be set or deduced. The flow rate at which the evaporator still can operate can be below several milligrams per hour.

Below you will find a discussion on experimental experience, design parameters and considerations, and control variables of the above described evaporator.

The experimental findings, and the design considerations and models that were conceived as a consequence of these findings, are described in general per section of the evaporator.

The pressure drop across the supply channels can be estimated by regular pressure drop correlations for laminar flow. For a fully stable operation this pressure drop should exceed the pressure fluctuations induced by the explosive bubble boiling, which is described in a later section.

The temperature jump of the evaporation section to the inlet section is determined by the heat conduction through the temperature jump (slot 13a, 13b and 14). The thermal resistance is increased by reducing the conduction area between the evaporation part and the inlet part. This thermal resistance can be increased by other means as well, like lengthening the temperature jump or implementation of a material with a low thermal conductivity.

The heat transfer area can be subdivided into three areas: the liquid heating area (liquid zone), the phase transition area (evaporation zone) and the vapor transport area (vapor zone).

After leaving the supply channels, the liquid first enters a zone where it is heated up to saturation temperature. This is the liquid heating area. In this region the liquid is heated by means of single phase heat transfer. Regular engineering relations for laminar flow can be used to obtain the length of the liquid heating zone. The single phase liquid heating may already take place in the narrow supply channels, 7a.

Above the saturation temperature, boiling starts in the phase transition area (PTA). In this area the vaporization takes place and different two-phase flow regimes can occur, depending on the physical properties of the liquid, the liquid supply flowrate, and the electrical dissipation rate in the heater.

Three different stages in the phase transition can be identified:
1. bubble incipience/spherical growth
2. channel blockage by the spherical bubble followed by its explosive growth 3. break-up of bubbles and evaporation of liquid slugs at the diamond structures 1. Incipience and Spherical Growth The vapor bubble incipience and its spherical growth leading to channel blockage can be modeled using standard theories for spherical bubble growth available in literature (e.g. N. Zuber, Int. J. Heat Mass Transfer, 2(1961) 83-98) or Plesset and Zwick (1954)). These models yield the time which is needed for a bubble to grow from an initial bubble size to a bubble size blocking the channel. This time is called the spherical bubble growth time, t_g. Bubbles do not immediately form directly after a bubble has departed. The time in between the bubble departure and the bubble incipience is called the waiting time, t_w. Some engineering relations exist to estimate this waiting period.

2. Channel Blockage and Explosive Growth

The spherical bubble growth is most often followed by a channel blockage. Due to the small channel sizes the vapor bubble does not tend to be swept away from the wall. High speed camera visualizations show an explosive growth just after the more slowly spherical bubble growth. An explanation for this can be found in the fact that the bubble comes in close contact with all (four) walls. The thin liquid layer forms only a small thermal resistance, allowing a large heat transfer inducing much evaporation. It is to be considered that only a relatively small amount of liquid results in a large vapor volume. Due to the channel blockage the bubble expansion is one dimensional instead of the three dimensional spherical bubble growth.

We have developed a theoretical model, predicting the explosive one-dimensional bubble growth. Using this model it is possible to estimate the bubble cap position, velocity and acceleration of an exploding bubble. These parameters determined the so-called propulsion time, t_p. These parameters determine as well how the liquid plugs in front of the exploding bubble are propelled. From these propulsion characteristics the induced pressure fluctuations can be determined.

3. Liquid Droplets Break-up and Evaporation

Sticking and break-up criteria of the propelled liquid droplets are formulated. Using these criteria and the information on the propelled droplets it is possible to estimated the liquid layer thickness on the evaporator structures, part 15, 25 or 35. This estimated liquid layer thickness and a heat flux model as proposed in literature (e.g. Thome (2004)) lead to an evaporation time, t_evap. In order for the evaporator to work properly the evaporation time has to be smaller than the sum of the waiting time, bubble spherical growth time and propulsion time:

$$t_{evap} < t_w + t_g + t_p$$

This maximum allowed time for evaporation and the number of liquid break-up structures parallel to each other determine the maximum evaporation capacity of the device.

Within the evaporator chamber a field of staggered argyle pillars is arranged. These pillars are thus arranged that slugs of liquid are broken on the sharp edges of the pillars and the two phase flow is forced to enter the annular flow regime. In this flow regime, the heat exchanging surface is covered with a thin layer of liquid. This thin layer of liquid provides a relative big evaporating surface. Accordingly the arrangement of the pillars and the operating conditions are thus chosen that an annular flow is obtained within the evaporator chamber.

The evaporation structure 15, 25, 35 is made of multiple crossing micro channels, which results in a fin like repetitive structure. The fins 15a, 25a, 35a are positioned in a staggered manner such that the flow, which has passed in between two fins, is split up by the following fin. The fins have a shape which supports liquid slug break-up and the evaporation of the thin liquid layer (which is formed on the fin after the liquid slug breakup).

At the end of the evaporation structure 15, 25, 35 the vapor is gathered in a vapor exit channel. For maximum flow capacity the temperature of the evaporation structure is controlled just below the "critical heat flux"-temperature of the liquid at the operating pressure. This "critical heat flux"-temperature is defined as the wall temperature above which the nucleate boiling regime no longer remains and the unstable and less efficient transitional boiling regime starts. For example, in case of water at 1 bar this "critical heat flux" temperature is about 125° C. Without changing the geometry, lower liquid flow rates can be dealt with by lowering the wall temperature as long the wall temperature is high enough to induce nucleate boiling. For example, in case of water at 1 bar the nucleate boiling regime starts at about 105° C. The energy supply structure is designed to obtain optimal temperature distribution in the phase transition area.

In the invention as described before numerous adaptations and modifications are possible, for instance the evaporator can be integrated in a separation process like for instance in a liquid gas phase equilibrium type of separation where generation of a gas phase is essential for the separation process. These processes can be for instance micro distillation, membrane pervaporation, residual and/or reactive distillation and/or other separation methods. For these application, part of or the complete wall structures can be provided with membrane structures, for instance in order to selectively remove certain components. The internal structure and/or the wall structure can alternatively or additionally be covered with or made of a material having catalytic properties.

These and other adaptations and modifications are possible without departing from the spirit and scope of the invention.

The invention claimed is:

1. Evaporator for evaporating a liquid containing fluid, comprising:
    an inlet and an outlet connected to a evaporation volume, the inlet and the outlet defining a main flow path there between, wherein the evaporation volume is equipped with an internal structure, wherein the internal structure is an internal connected channel structure for breaking up liquid slug, and the cross-section of the evaporation volume is substantially constant along the main flow path.

2. The evaporator according to claim 1, wherein the internal structure comprised a regular pattern.

3. The evaporator according to claim 2, wherein the regular pattern is a field of pillars, arranged in a staggered way.

4. The evaporator according to claim 3, wherein the pillars are selected from the group consisting of: substantially diamond shaped and arranged in an argyle pattern, substantially rectangularly shaped, substantially elliptically shaped, substantially triangularly shaped, substantially hexagonally shaped and arranged in a honeycomb pattern, and substantially circularly shaped.

5. The evaporator according to claim 1 wherein the evaporator part of or the complete wall structure and/or the internal structure is provided with or made of a material having catalytic and/or membrane properties.

6. The evaporator according to claim 1 wherein a heat source is arranged along at least a part of a wall of the evaporating volume.

7. The evaporator according to claim 1 wherein a pressure drop inducer is positioned between the inlet and the evaporation volume.

8. Method for evaporating a liquid containing fluid comprising the steps of:
  providing an evaporator according to claim 1;
  supplying a liquid containing feed stream to the inlet of the evaporator;
  exerting heat to the evaporator volume; and
  choosing the operating conditions of the evaporator thus that an annular flow is created within the evaporator volume.

* * * * *

UNITED STATES PATENT AND TRADEMARK OFFICE
CERTIFICATE OF CORRECTION

PATENT NO. : 8,475,626 B2  
APPLICATION NO. : 12/809654  
DATED : July 2, 2013  
INVENTOR(S) : Rops et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this  
Eighth Day of September, 2015

Michelle K. Lee  
*Director of the United States Patent and Trademark Office*